United States Patent
Sun et al.

(10) Patent No.: US 9,945,977 B2
(45) Date of Patent: Apr. 17, 2018

(54) METHOD AND APPARATUS FOR DETERMINING FORMATION PROPERTIES USING NON-DIRECTIONAL ELECTROMAGNETIC MEASUREMENTS IN HIGH ANGLE OR HORIZONTAL WELLS

(71) Applicant: Schlumberger Technology Corporation, Sugar Land, TX (US)

(72) Inventors: Keli Sun, Sugar Land, TX (US); Roger Griffiths, Selangor (MY); Steve Crary, Al-Khobar (SA); Christopher Morriss, Sugar Land, TX (US); Koji Ito, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/026,234

(22) PCT Filed: Oct. 2, 2014

(86) PCT No.: PCT/US2014/058835
§ 371 (c)(1),
(2) Date: Mar. 30, 2016

(87) PCT Pub. No.: WO2015/051123
PCT Pub. Date: Apr. 9, 2015

(65) Prior Publication Data
US 2016/0252643 A1    Sep. 1, 2016

Related U.S. Application Data

(60) Provisional application No. 61/885,861, filed on Oct. 2, 2013.

(51) Int. Cl.
*G01V 3/00* (2006.01)
*G01V 3/28* (2006.01)
(Continued)

(52) U.S. Cl.
CPC .................. *G01V 3/28* (2013.01); *G01V 3/30* (2013.01); *G01V 3/38* (2013.01)

(58) Field of Classification Search
CPC ... G01V 3/28; G01V 3/38; G01V 3/18; G01V 3/20; G01V 3/22; G01V 3/24; G01V 3/26;
(Continued)

(56) References Cited

U.S. PATENT DOCUMENTS

| 4,899,112 A | 2/1990 | Clark et al. |
| 5,230,386 A * | 7/1993 | Wu .......................... E21B 7/046 175/45 |

(Continued)

FOREIGN PATENT DOCUMENTS

WO    2015051123 A1    4/2015

OTHER PUBLICATIONS

Fang et al., Determination of Structural Dip and Azimuth From LWD Azimuthal Propagation Resistivity Measurements in Anisotropic Formations, SPE 116123, 2008, 13 pages, Sep. 21-24, 2008 SPE Annual Technical Conference and Exhibition, Denver, Co, USA.

(Continued)

*Primary Examiner* — Thang Le

(57) ABSTRACT

Embodiments set forth in this disclosure providing techniques for determining formation parameters, such as horizontal resistivity (Rh), vertical resistivity (Rv), and dip, in high angle and horizontal wells using non-directional resistivity measurements. For example, a method is provided that may include using an electromagnetic logging tool to acquire non-directional resistivity measurements in a wellbore of a high angle or horizontal well. The method may also include defining a processing window that corresponds to a measurement point of the electromagnetic logging tool (Continued)

along a well trajectory that intersects a at least one bed boundary between two layers of a subsurface formation. The method may also include defining a formation structure and defining an initial set of formation parameters for each layer in the formation structure. Furthermore, the method may include inverting the formation parameters for each layer.

18 Claims, 10 Drawing Sheets

(51) Int. Cl.
    *G01V 3/30*     (2006.01)
    *G01V 3/38*     (2006.01)

(58) Field of Classification Search
    CPC . G01V 3/30; G01V 3/10; G01V 3/265; G01V 3/02; G01V 3/04; G01V 3/06; G01V 3/104; E21B 47/026; E21B 47/122; E21B 47/0905; E21B 47/09; E21B 47/011; E21B 47/12; E21B 47/101; E21B 47/102; G01N 27/223; G01N 33/246; G01R 27/18; G01R 27/20
    USPC ........ 324/324–375; 340/853.1–853.9, 854.1, 340/855.1–855.9, 856.1–856.4
    See application file for complete search history.

(56) References Cited

U.S. PATENT DOCUMENTS

| | | | |
|---|---|---|---|
| 5,757,191 A * | 5/1998 | Gianzero | G01V 3/28 324/339 |
| 6,163,155 A | 12/2000 | Bittar | |
| 6,594,584 B1 | 7/2003 | Omeragic et al. | |
| 7,894,990 B2 * | 2/2011 | Wang | G01V 3/28 702/6 |
| 8,433,518 B2 | 4/2013 | Omeragic et al. | |
| 2002/0101242 A1 | 8/2002 | Bittar | |
| 2004/0090234 A1 | 5/2004 | Macune | |
| 2004/0123655 A1 | 7/2004 | MacPherson | |
| 2008/0078580 A1 | 4/2008 | Bittar | |
| 2010/0123462 A1 * | 5/2010 | Bittar | G01V 3/28 324/369 |
| 2011/0231098 A1 | 9/2011 | Omeragic et al. | |
| 2013/0320985 A1 * | 12/2013 | Liu | G01V 3/12 324/339 |

OTHER PUBLICATIONS

Griffiths et al., Formation Evaluation in High Angle and Horizontal Wells—A New and Practical Workflow, 16 pages, Jun. 16-20, 2012, Society of Petrophysicists and Well Log Analysts 53rd Annual Logging Symposium, Cartagena, Colombia.

International Search Report and the Written Opinion for International Application No. PCT/US2014/058835 dated Jan. 19, 2015.

* cited by examiner

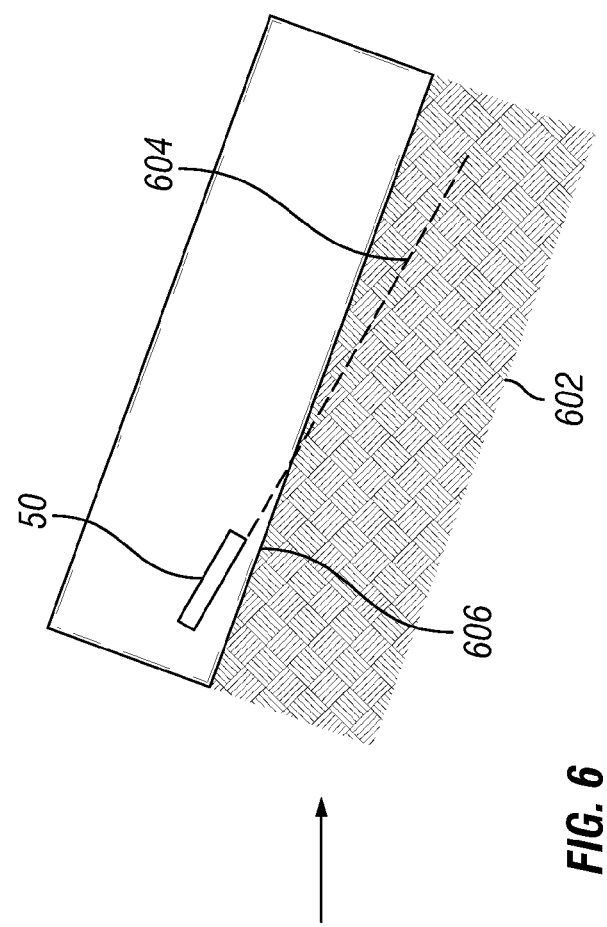
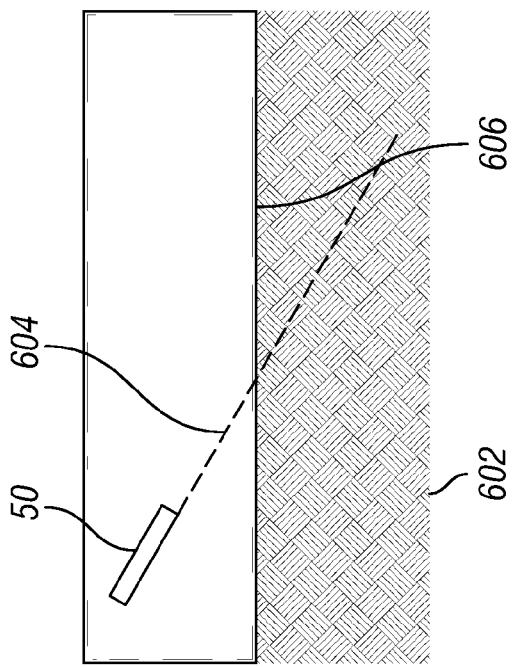
FIG. 6

METHOD AND APPARATUS FOR DETERMINING FORMATION PROPERTIES USING NON-DIRECTIONAL ELECTROMAGNETIC MEASUREMENTS IN HIGH ANGLE OR HORIZONTAL WELLS

CROSS-REFERENCE TO RELATED APPLICATION

This application claims priority to U.S. Provisional Patent Application Ser. No. 61/885,861 filed on Oct. 2, 2013 and entitled, "Method and Apparatus for Determining Formation Properties Using Non-Directional Electromagnetic Measurements in High Angle or Horizontal Wells," the contents of which are incorporated herein for all purposes.

BACKGROUND

The disclosure generally relates to determining formation properties, and more particularly relates to methods and apparatuses for determining formation properties using non-directional electromagnetic measurements in high angle or horizontal wells.

This section is intended to introduce various aspects of the subject matter described and/or claimed below. This discussion is believed to be helpful in providing background information to facilitate a better understanding of the various aspects of the present disclosure. Accordingly, it should be understood that these statements are to be read in this light, not as admissions.

Logging may be used in wellbores to make, for example, formation evaluation measurements to infer properties of the formations surrounding the borehole and the fluids in the formations. Typical logging tools may include electromagnetic (resistivity) tools, nuclear tools, acoustic tools, and nuclear magnetic resonance (NMR) tools, though various other types of tools for evaluating formation properties (also referred to as "formation parameters") are also available. Early logging tools were run into a wellbore on a wireline cable after the wellbore had been drilled. Modern versions of such wireline tools may still be used extensively. However, as the demand for information while drilling a borehole continued to increase, measurement-while-drilling (MWD) tools and logging-while-drilling (LWD) tools have since been developed. MWD tools may typically provide drilling parameter information such as weight on the bit, torque, temperature, pressure, direction, and inclination. LWD tools may typically provide formation evaluation measurements such as resistivity, porosity, NMR distributions, and so forth. MWD and LWD tools may have characteristics common to wireline tools (e.g., transmitting and receiving antennas, sensors, etc.), but may be designed and constructed to endure and operate in the harsh environment of drilling.

Additionally, electromagnetic measurements may be used in downhole applications, such as logging-while-drilling (LWD) and wireline logging applications. For example, electromagnetic measurements may be used to determine a subterranean formation resistivity (including horizontal resistivity (Rh) and vertical resistivity (Rv)), formation dip, azimuth, as well as detection of bed boundaries. Further, sometimes alone or in conjunction with other formation measurements (such as porosity), electromagnetic measurements may be used to indicate the presence of hydrocarbons in the formation.

Non-directional tools may refer to tools that use antennas having magnetic dipoles that are parallel with the tool axis (sometimes referred to as a z-direction), and may be referred to as axial antennas. Non-directional measurements may, in certain instances, be referred to as "conventional" electromagnetic measurements. In low angle and vertical wells, non-directional resistivity measurements may be sensitive to Rh, with no and/or slight sensitivity to Rv. However, in high angle and horizontal wells, non-directional electromagnetic measurements may be sensitive to Rh, Rv, and formation dip. Moreover, in a homogenous formation, Rv and dip may be coupled, meaning that different pairs of Rv and dip values can produce the same z-z coupling response for a given axial transmitter and axial receiver pair. In such circumstances, Rv and dip may be difficult to distinguish from non-directional resistivity measurements alone in high angle or horizontal wells.

More recently, directional resistivity tools have been developed that may make use of tilted or transverse antennas (antennas that have a magnetic dipole that is tilted or transverse with respect to the tool axis). A transverse antenna may generate a radiation pattern that may be equivalent to a dipole that is perpendicular to the tool axis (by convention the x- or y-direction). A tilted antenna may be an antenna whose dipole moment is neither parallel nor perpendicular to the longitudinal axis of the tool. Tilted antennas may generate a mixed mode radiation pattern (i.e., a radiation pattern in which the dipole moment is neither parallel nor perpendicular with the tool axis). Electromagnetic measurements made by transverse or tilted antennas may be referred to as directional measurements. Such a directional arrangement (a tilted and/or transverse antenna) may produce a preferential sensitivity on one azimuthal side of the logging tool, which may enable the tool to better detect bed boundaries and other features of the subterranean formations to be identified and located. As such, when compared to conventional/non-directional resistivity measurements, directional resistivity responses may be better suited to determining formation characteristics in high angle or horizontal wells.

While some electromagnetic logging tools may be capable of making both directional and non-directional measurements, sometimes a particular drilling application or job may be limited to an electromagnetic logging without directional measurement capability. For instance, depending on various factors, such as cost constraints, some drilling jobs may be limited to conventional electromagnetic measurements. However, while such measurements are generally suitable for determining formation properties (such as Rh, Rv, and dip) in low angle or vertical wells, the determination of such formation properties can become increasing difficult in higher angle or horizontal wells.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth in this section.

Embodiments set forth in this disclosure relate to techniques for determining formation parameters, such as horizontal resistivity (Rh), vertical resistivity (Rv), and dip, in high angle and horizontal wells using non-directional resistivity measurements. According to one or more embodiments, an example method is provided. The method may include using an electromagnetic logging tool, which may include an axial transmitter antenna and an axial receiver antenna to acquire non-directional resistivity measurements in a wellbore of a high angle or horizontal well. In addition, the method may include defining a processing window that corresponds to a measurement point of the electromagnetic logging tool along a well trajectory that intersects a bed boundary between two layers of a subsurface formation. The method may also include defining a formation structure corresponding to the processing window. The formation structure may include a number of layers and respective locations associated with the bed boundary. Furthermore, the method may include defining an initial set of formation parameters for each layer in the formation structure and inverting the formation parameters for each layer.

According to other embodiments, a system is provided. The system may include a processor and a memory. The memory may store computer-executable instructions, and the processor may execute the instructions. As such, the instructions may cause the processor to receive non-directional resistivity measurements in a wellbore of a high angle or horizontal well from an electromagnetic logging tool. The electromagnetic logging tool may include an axial transmitter antenna and an axial receiver antenna to acquire the non-directional resistivity measurements. Furthermore, the instructions may cause the processor to define a processing window that corresponds to a measurement point of the electromagnetic logging tool along a well trajectory that intersects at least one bed boundary between two layers of a subsurface formation. The instructions may also cause the processor to define a formation structure corresponding to the processing window. The formation structure may include a number of layers and respective locations associated with the at least one bed boundary. In addition, the instructions may cause the processor to define an initial set of formation parameters for each layer in the formation structure to invert the formation parameters for each layer.

According to other embodiments, a non-transitory computer readable medium is provided. The computer readable medium may store computer-executable instructions. The instructions may be executed by a processor. As such, the instructions may cause the processor to receive non-directional resistivity measurements in a wellbore of a high angle or horizontal well from an electromagnetic logging tool. The electromagnetic logging tool may include an axial transmitter antenna and an axial receiver antenna to acquire the non-directional resistivity measurements. Furthermore, the instructions may cause the processor to define a processing window that corresponds to a measurement point of the electromagnetic logging tool along a well trajectory that intersects at least one bed boundary between two layers of a subsurface formation. The instructions may also cause the processor to define a formation structure corresponding to the processing window. The formation structure may include a number of layers and respective locations associated with the at least one bed boundary. In addition, the instructions may cause the processor to define an initial set of formation parameters for each layer in the formation structure to invert the formation parameters for each layer.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 6 illustrates a diagram of a change in formation dip for a fixed well trajectory in accordance with one or more example embodiments.

Figure 1:
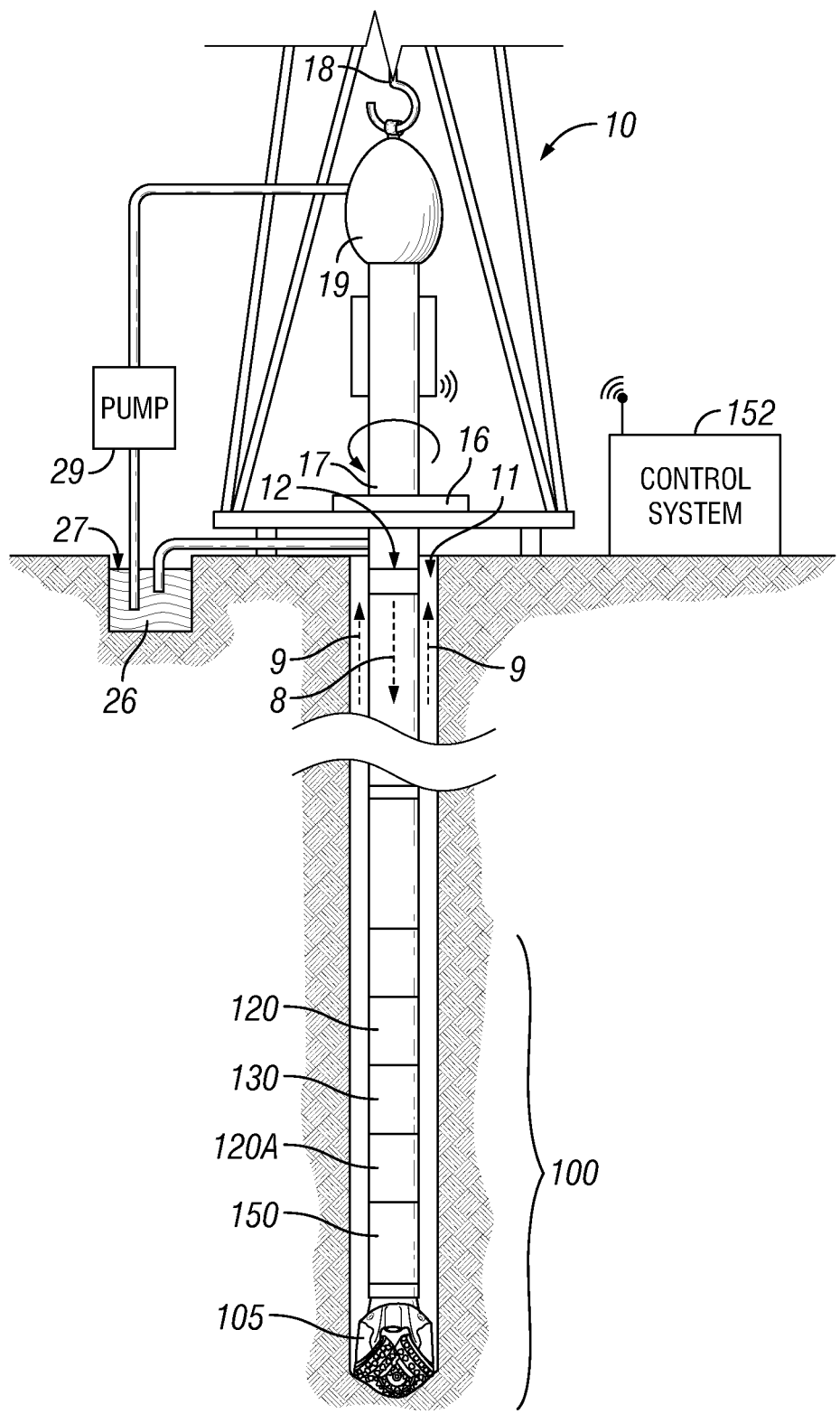
FIG. 1 illustrates an example view of a well site system in accordance with one or more example embodiments.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

One or more example embodiments of the present disclosure are described below. Additionally, in an effort to provide a concise description of these embodiments, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The embodiments discussed below are intended to be examples that are illustrative in nature and should not be construed to mean that the specific embodiments described herein are necessarily preferential in nature. Additionally, it should be understood that references to "one embodiment" or "an embodiment" within the present disclosure are not to be interpreted as excluding the existence of additional embodiments that also incorporate the recited features.

FIG. 1 represents a simplified view of a well site system in which various embodiments can be employed. The well site system depicted in FIG. 1 can be deployed in either onshore or offshore applications. In this type of system, a borehole 11 may be formed in subsurface formations by rotary drilling. Some embodiments can also use directional drilling.

A drill string 12 may be suspended within the borehole 11 and may have a bottom hole assembly (BHA) 100 which includes a drill bit 105 at its lower end. The surface system may include a platform and derrick assembly 10 positioned over the borehole 11, with the assembly 10 including a rotary table 16, kelly 17, hook 18 and rotary swivel 19. In a drilling operation, the drill string 12 may be rotated by the rotary table 16 (energized by means not shown), which may engage the kelly 17 at the upper end of the drill string. The drill string 12 may be suspended from a hook 18, attached to a traveling block (also not shown), through the kelly 17 and a rotary swivel 19 which may permit rotation of the drill string 12 relative to the hook 18. In other embodiments, a top drive system may be used.

Drilling fluid or mud 26 may be stored in a pit 27 formed at the well site. A pump 29 may deliver the drilling fluid 26 to the interior of the drill string 12 via a port in the swivel 19, which may cause the drilling fluid 26 to flow downwardly through the drill string 12, as indicated by the directional arrow 8 in FIG. 1. The drilling fluid may exit the drill string 12 via ports in the drill bit 105, and may then circulate upwardly through the annulus region between the outside of the drill string 12 and the wall of the borehole, as indicated by the directional arrows 9. In this manner, the drilling fluid may lubricate the drill bit 105 and carry formation cuttings up to the surface as it is returned to the pit 27 for recirculation.

The drill string 12 may include a BHA 100. In the illustrated embodiment, the BHA 100 may be shown as having one MWD module 130 and multiple LWD modules 120 (with reference number 120A depicting a second LWD module 120). As used herein, the term "module" as applied to MWD and LWD devices is understood to mean either a single tool or a suite of multiple tools contained in a single modular device. Additionally, the BHA 100 may include a rotary steerable system (RSS) and motor 150 and a drill bit 105.

The LWD modules 120 may be housed in a drill collar and may include one or more types of logging tools. The LWD modules 120 may further include capabilities for measuring, processing, and storing information, as well as for communicating with the surface equipment. By way of example, the LWD module 120 may include an electromagnetic logging tool. In accordance with various embodiments, the electromagnetic logging tool may include non-directional transmitter and receiver antennas for acquisition of non-directional electromagnetic measurements. In one embodiment, the electromagnetic logging tool may lack the capability to make directional electromagnetic measurements (e.g., all of its transmitter and receiver antennas may be axially oriented, with no tilted or transverse antennas).

The MWD module 130 may also be housed in a drill collar, and can contain one or more devices for measuring characteristics of the drill string and drill bit. The MWD module 130 can include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The MWD tool 130 may further include an apparatus (not shown) for generating electrical power for the downhole system. For instance, power generated by the MWD tool 130 may be used to power the MWD tool 130 and the LWD tool(s) 120. In some embodiments, this apparatus may include a mud turbine generator powered by the flow of the drilling fluid 26. It is understood, however, that other power and/or battery systems may be employed.

The operation of the assembly 10 of FIG. 1 may be controlled using control system 152 located at the surface. The control system 152 may include one or more processor-based computing systems. In the present context, a processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read-only memory, random access memory, a hard drive, optical disk, flash memory, etc.). Such instructions may correspond to, for instance, workflows and the like for carrying out a drilling operation, algorithms and routines for processing data received at the surface from the BHA 100 (e.g., as part of an inversion to obtain one or more desired formation parameters), and so forth.

Figure 2:
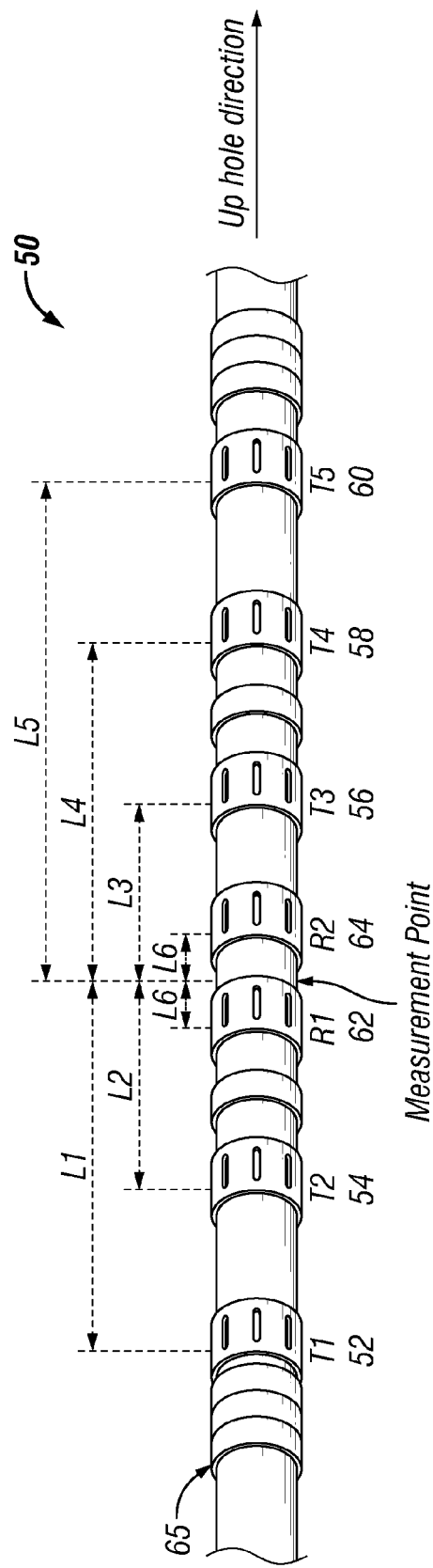
FIG. 2 illustrates a schematic diagram of an example electromagnetic measurement tool in accordance with one or more example embodiments.

FIG. 2 depicts one example of an electromagnetic measurement tool 50, which may be part of the LWD module 120 of FIG. 1. The tool 50 may be a multi-spacing non-directional electromagnetic induction or propagation tool. In one embodiment, the tool 50 may be capable of facilitating measurements at multiple frequencies, such as at approximately 400 kHz, and approximately 2 MHz. In the depicted embodiment, the measurement tool 50 may include multiple transmitters T1, T2, T3, T4, T5, depicted at 52, 54, 56, 58, and 60 and multiple receivers R1 and R2 depicted at 62 and 64, spaced axially along tool body 65. The multiple transmitters T1, T2, T3, T4, and T5 may be spaced at distances of L1, L2, L3, L4, and L5 from the illustrated measurement point, respectively. Additionally, the multiple receivers R1 and R2 may be spaced at a distance of L6 away from the illustrated measurement point, respectively. In certain implementations, L1 may be approximately 28 inches, L2 may be approximately 16 inches, L3 may be approximately 10 inches, L4 may be approximately 22 inches, L5 may be approximately 28 inches, and L6 may be approximately 3 inches. It will be appreciated, however, that various distances are also possible with respect to L1, L2, L3, L4, L5, and L6. In one example embodiment, the tool 50 may be capable of generating approximately 20 measurement channels (attenuation and phase shift measurements for five spacings at two above-mentioned frequencies).

In certain implementations, all of the transmitters 52, 54, 56, 58, 60 and receivers 62, 64 of the tool 50 may include axial antennas. As used herein, an axial antenna may be an antenna associated with a dipole moment substantially parallel with the longitudinal axis of the tool 50. Axial antennas may be wound about the circumference of the logging tool 50 such that the plane of the antenna is orthogonal to the tool axis. Axial antennas may produce a radiation pattern equivalent to a dipole along the axis of the tool 50 (by convention the z-direction). As discussed above, electromagnetic measurements determined by axially oriented antennas may be referred to as conventional or non-directional measurements.

It is noted that the tool 50 shown in FIG. 2 may lack tilted or transverse antennas, and thus, may not be designed to provide directional measurements. Accordingly, with respect to electromagnetic resistivity measurements, the tool 50 may be configured to provide non-directional resistivity responses, but may lack directional measurement capability.

The example logging tool 50 depicted in FIG. 2 may be a model of a tool available under the name ARCVISION from Schlumberger Technology Corporation of Sugar Land, Tex. Other examples of tools available from Schlumberger that are capable of making non-directional electromagnetic measurements but not directional electromagnetic measurements may include CDR and ECOSCOPE. It will be understood, however, that the embodiments disclosed herein are not limited to any particular electromagnetic logging tool configuration (provided that the electromagnetic logging tool is capable of making non-directional resistivity measurements), and that the tool 50 depicted in FIG. 2 is merely one example of a suitable electromagnetic logging tool. Moreover, while the tool 50 is described with reference to FIGS. 1 and 2 as being used in an LWD context, it will be understood that the tool 50 may also be conveyed by other suitable means, such as wireline, slickline, coil tubing, wired drill pipe, and so forth.

It should also be understood that though the tool 50 shown in FIG. 2 may lack directional antennas, other embodiments of the tool 50 may in fact include one or more directional antennas. For instance, the tool 50 may be capable of acquiring both directional and non-directional resistivity measurements. As an example, the tool 50 (e.g., PERISCOPE, which may be a tool available from Schlumberger) may include tilted receiver antennas and a transverse transmitter antenna, as well as several axial transmitter and receiver antennas. In such embodiments, the tool 500 may thus be capable of acquiring both directional and non-directional resistivity measurements.

However, according to the embodiments described herein, directional measurements may not be used in determining formation properties (also referred to as "formation parameters"), such as Rh, Rv, and dip, in high angle/horizontal wells. That is, the various embodiments presented herein may relate to techniques for determining such formation properties in high angle or horizontal wells with non-directional resistivity measurements (e.g., without requiring directional resistivity measurements). For the purposes of this disclosure, a high angle well may refer to a well having an inclination of greater than 45 degrees with respect to vertical, and a low angle well may refer to a well having an inclination of less than 45 degrees with respect to vertical.

As discussed above, embodiments set forth in this disclosure may provide techniques for determining formation parameters, such as horizontal resistivity (Rh), vertical resistivity (Rv), and dip, in high angle and horizontal wells using non-directional resistivity measurements. As will be appreciated, in low angle and vertical wells, non-directional resistivity measurements may be sensitive to Rh while having little to no sensitivity to Rv. However, in high angle and horizontal wells, the z-z couplings of non-directional measurements may become sensitive to Rh, Rv, and formation dip. In homogenous formations, this sensitivity can cause coupling of Rv and formation dip such that different pairs of Rv and dip values may produce the same z-z coupling response. As a result, it may be difficult to distinguish Rv and dip values from non-directional resistivity measurements. In other words, non-directional measurements alone may not include sufficient information to determine Rh, Rv, and dip for high angle or horizontal wells in homogeneous formations.

In accordance with embodiments of the techniques described in this disclosure, it may be observed that when the tool (e.g., tool 50) is deployed within the well and the well trajectory crosses or is near a bed boundary with sufficient resistivity contrast, additional information relating formation dip can be obtained. For instance, for a given well trajectory, a measurement position of the tool relative to the bed boundary (or boundaries) may be associated with a strong correlation to formation dip in high angle/horizontal wells. In certain implementations, the measurement position of the tool relative to the bed boundary may be determined as a function of formation dip. This distance-dip relationship can provide extra dip information in the measurements which may be used to decouple Rv from dip, and thus allow for a determination of Rh, Rv, and dip in high angle or horizontal wells using only non-directional measurements (e.g., using only z-z couplings without directional measurements, such as those acquired using tilted and/or transverse antennas). Various embodiments of such techniques are described below.

Figure 3A:
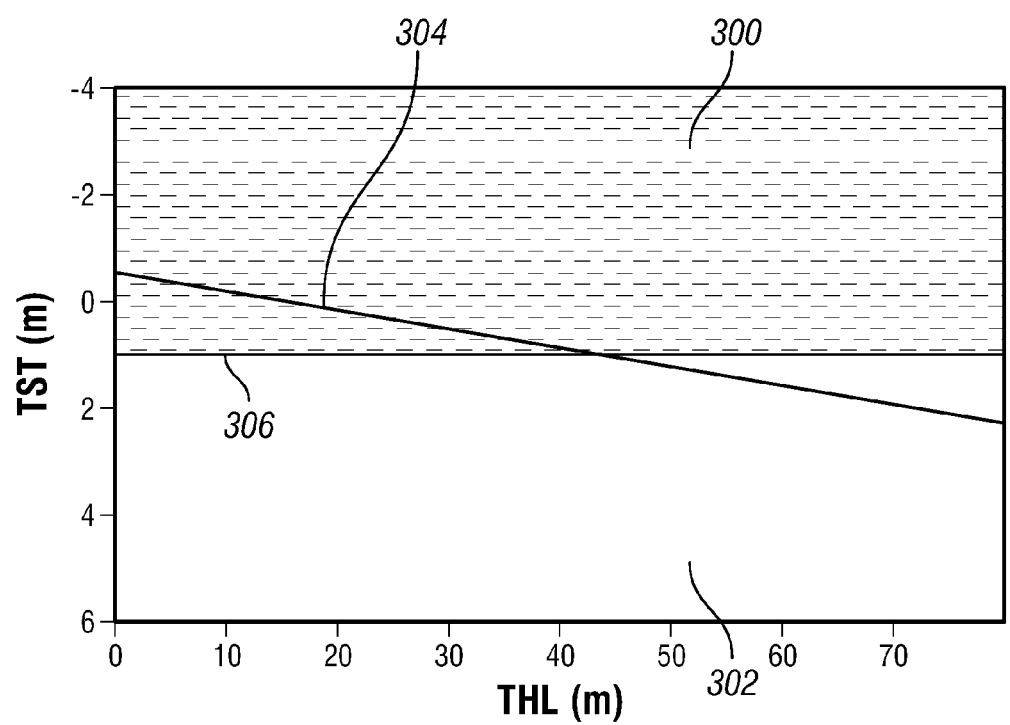
FIG. 3A illustrates an example formation model in accordance with one or more example embodiments.
Figure 3B:
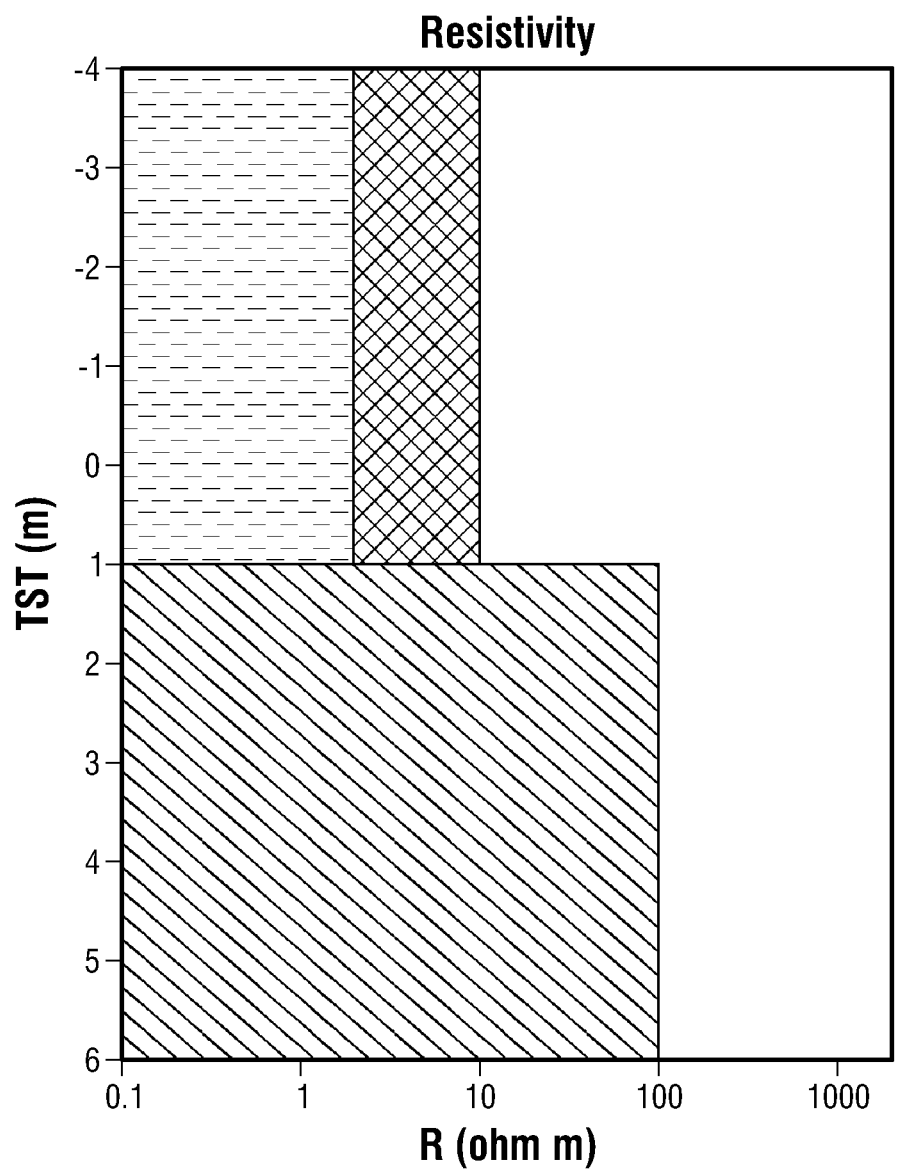
FIG. 3B illustrates an example resistivity profile in accordance with one or more example embodiments.

Referring to FIG. 3A, a two layer formation model is shown in accordance with one or more example embodiments. As depicted in FIG. 3A, a top layer 300 of a formation may be conductive shale with anisotropy, and a bottom layer 302 may be resistive sand layer. A well trajectory 304 is shown that extends from the top layer 300 to the bottom layer 302, thus crossing a layer boundary 306. Depending on the apparent dip angle (e.g., the angle between the formation normal and the well trajectory 304), different Rh-Rv resistivity profiles may be determined. For example, FIG. 3B shows an illustrative Rh-Rv resistivity profile for an example apparent dip angle of 88 degrees. As depicted in FIG. 3B, the bottom layer 302 (e.g., the sand layer) is more resistive compared to the top layer 300 (e.g., the shale layer).

Figure 4:
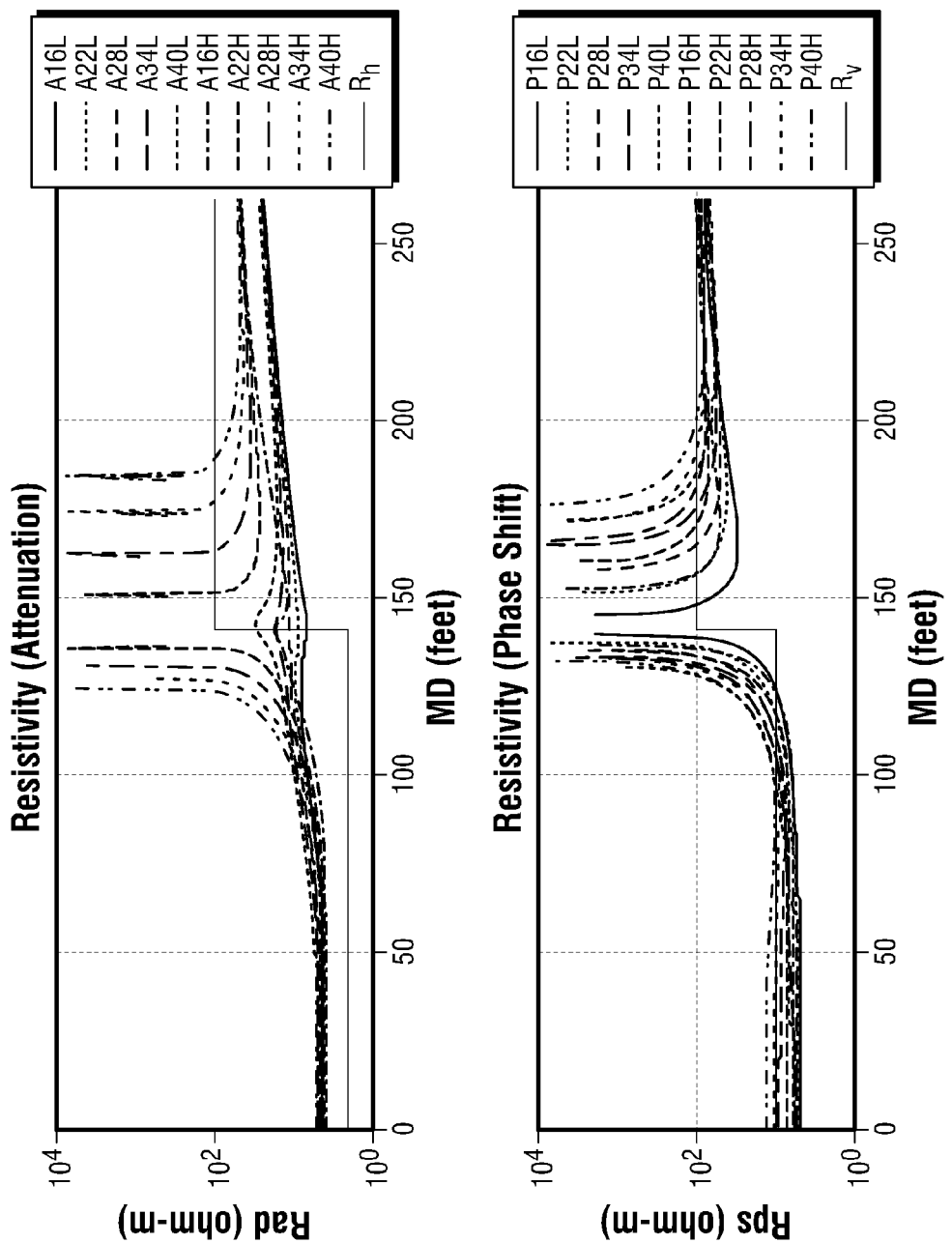
FIG. 4 illustrates example measurements obtained from well formation in accordance with one or more example embodiments.

FIG. 4 shows example measurements obtained from the example formation of FIGS. 3A and 3B using the example logging tool 50 of FIG. 2. Assuming antenna spacings and two measurement frequencies (e.g., as discussed above with respect to FIG. 2), approximately twenty measurement channels may be available along the well trajectory 304. The various curves may correspond to different transmitter-receiver spacings in both up and down directions with respect to the downhole direction. For example, a down measurement may be a measurement in which the receiver(s) is further downhole than the transmitter(s), and an up measurement may be a measurement in which the transmitter(s) is further downhole than the receiver(s). In the illustrated example, the tool (e.g., tool 50 of FIG. 2) that acquires the displayed measurements may provide for the same antenna spacings for up and down measurements, which in certain implementations may be referred to as symmetrized and anti-symmetrized measurements. As a reference, formation resistivity (Rh and Rv) may also be plotted in FIG. 4. As can be seen in FIG. 4, as the electromagnetic logging tool approaches or crosses a bed boundary (at a measurement depth of approximately 140 feet), horn-like artifacts may become present in the measurements. Such artifacts may be referred to as a "polarization horn" and may include artifacts of propagation resistivity measurements that may occur when approaching bed boundaries with high resistivity contrast (e.g., between a shale layer and a sand layer in the formation).

According to one or more embodiments, the apparent dip angle may be changed by altering either formation dip or well inclination. When the dip changes, the tool response may be affected due to the following two mechanisms—(1) the relative angle between the tool axis and the formation changes; or (2) for a fixed well trajectory, changes in formation dip may in the alteration of tool position relative to the formation.

Figure 5:
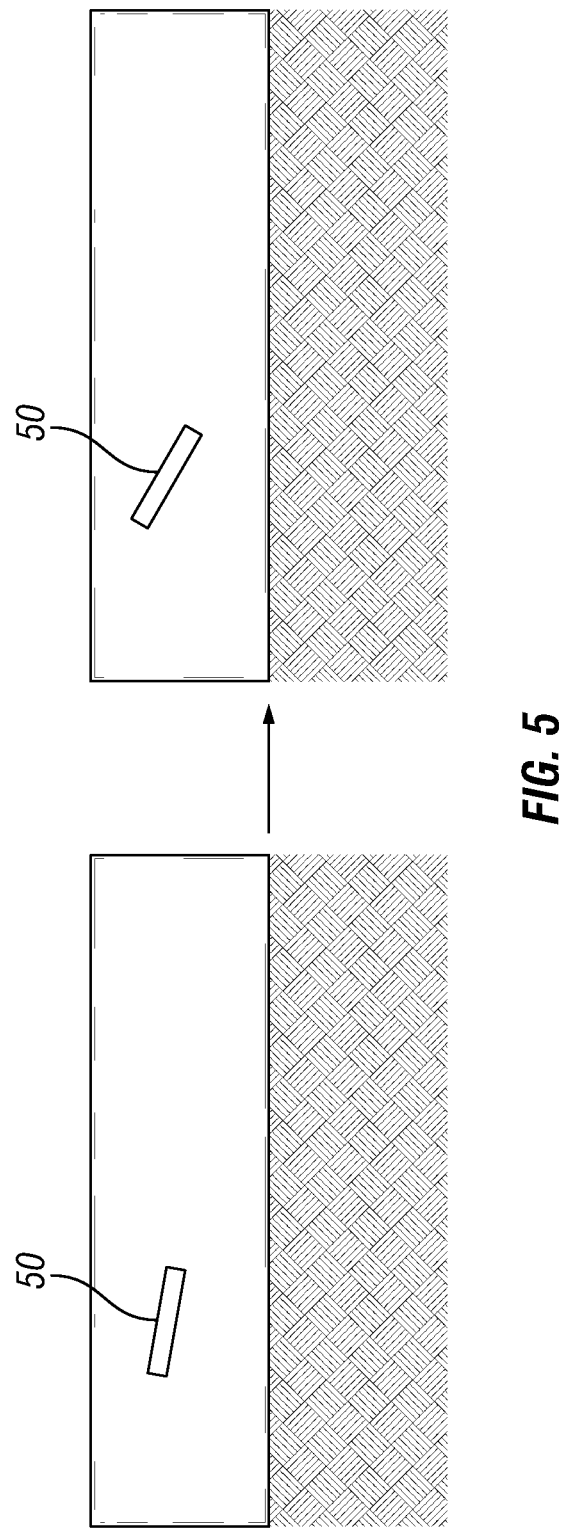
FIG. 5 illustrates a diagram of a change in the relative angle between a tool axis and a formation in accordance with one or more example embodiments.

FIG. 5 provides a diagram illustrating a change in the relative angle between an axis of the tool 50 and a formation in accordance with one or more example embodiments. Here, considering a tool measurement at a given measurement point, the tool's non-directional resistivity responses may be sensitive to the apparent dip (in cases of high dip angles) and the formation anisotropy. However, the effect of dip and anisotropy may be coupled (as discussed above) and may be difficult to separate from each other.

FIG. 6 provides a diagram illustrating a change in formation dip for a fixed well trajectory in accordance with one or more example embodiments. Under this scenario, consider measurements taken along a segment (or a processing window 602) of a well trajectory 604. As depicted in FIG. 6, within the given processing window 602, the well trajectory 604 may cross or may be positioned relatively near one or more bed boundaries 606 with sufficient resistivity contrast. For the given well trajectory 604, the tool measurement positions relative to the bed boundary 606 (or bed boundaries) may be associated with a strong correlation to and/or function of formation dip, especially in high angle cases.

Accordingly, the tool response of the tool (e.g., tool 50) may be sensitive to formation dip due to geometric dependency. However, such dip dependency may be independent of formation anisotropy. Thus, using the properties illustrated and described with reference to FIG. 6, formation dip and anisotropy can be decoupled and individually solved for using non-directional resistivity responses (e.g., using z-z couplings without additional directional resistivity measurements).

Figure 7:
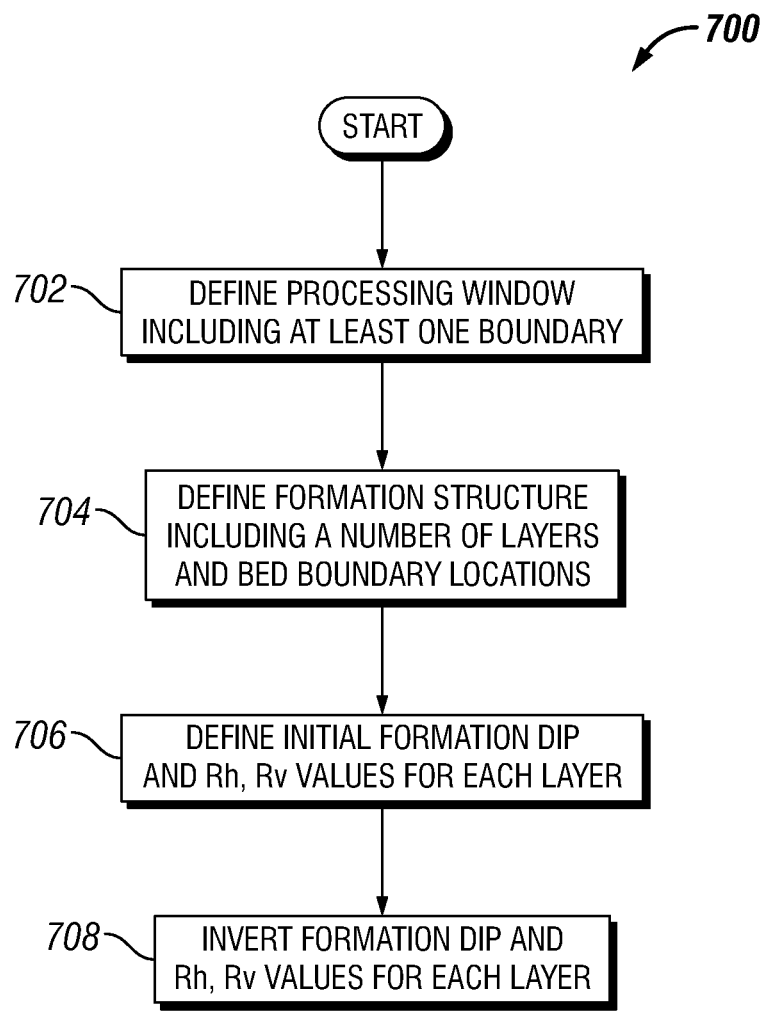
FIG. 7 illustrates a flow diagram of an example method for determining formation parameters in accordance with one or more example embodiments.

In accordance with certain embodiments, Rh, Rv and formation dip values may be determined by simultaneously inverting these values from the non-directional resistivity measurements. As such, an example process 700 embodiment is shown in FIG. 7 for determining Rh, Rv, and formation dips values. At block 702, a processing window may be defined such that the processing window includes and/or is otherwise associated with at least one bed boundary. Additionally, the processing window may be determined such that the least one bed boundary is associated with sufficient resistivity contrast between at least two layers of a formation.

Once the processing window is defined, a formation structure within the window may be defined at block 704. The formation structure may be defined by respective bed boundary locations associated with the at least one bed boundary and a number of layers which may be defined using prior knowledge. Furthermore, the formation structure may include and/or otherwise be associated with various information related resistivity measurements (e.g. non-directional measurements) and/or other types of measurements. At block 706, initial dip, Rh, and Rv values for each layer within the processing window may be defined and/or otherwise provided. Such values can be provided by a user (e.g., an operator) and, further, more than one set of initial dip, Rh, and Rv values may be provided in some embodiments. At block 708, the respective formation dip, Rh, and Rv values for each layer within the processing window may be inverted. As will be appreciated, constraints can be imposed on these inversions to ensure feasible solutions.

To demonstrate the inversion process 700 depicted in FIG. 7, the two layer formation model from FIG. 3A will be used as an example. This processing window may include one bed boundary 306, with the bed boundary location assumed to be known. As discussed above, the top layer 300 may be conductive anisotropic shale and the bottom layer 302 may be resistive sand (for which it may be assumed that non-directional resistivity measurements are not sensitive to its anisotropy). The inversion parameters in this example may include (1) formation dip, (2) resistivity of the shale top layer 300 (Rh1 and Rv1), and (3) resistivity of the sand bottom layer 302 (Rh2). It is noted that the bottom layer 302 in this example may be forced to be isotropic (i.e., Rv2=Rh2). Referring to Table 1 below, inversion results are shown from two sets of initial parameters. As shown in Table 1, the inversion may provide results that are very close to the true values.

TABLE 1

INVERSION RESULTS COMPARED TO TRUE VALUES

| | Rh1 (ohm · m) | Rv1 (ohm · m) | Rh2 (ohm · m) | dip (deg) |
|---|---|---|---|---|
| True value | 2 | 10 | 100 | 0 |
| Initial I | 2.5 | 8 | 50 | −7 |
| Inverted I | 1.9986 | 9.9957 | 99.8044 | 1.722E−3 |
| Initial II | 1.5 | 4 | 50 | 1 |
| Inverted II | 1.9986 | 9.9958 | 99.8140 | 1.7068E−3 |

In the example above, all four parameters (Rh1, Rv1, Rh2, and dip) may be inverted together and converged to true values for both initial sets. For a flat surface, the formation dip may be defined as 0 degrees (e.g., with an apparent dip of 88 degrees due to an 88 degree well inclination).

Figure 8:
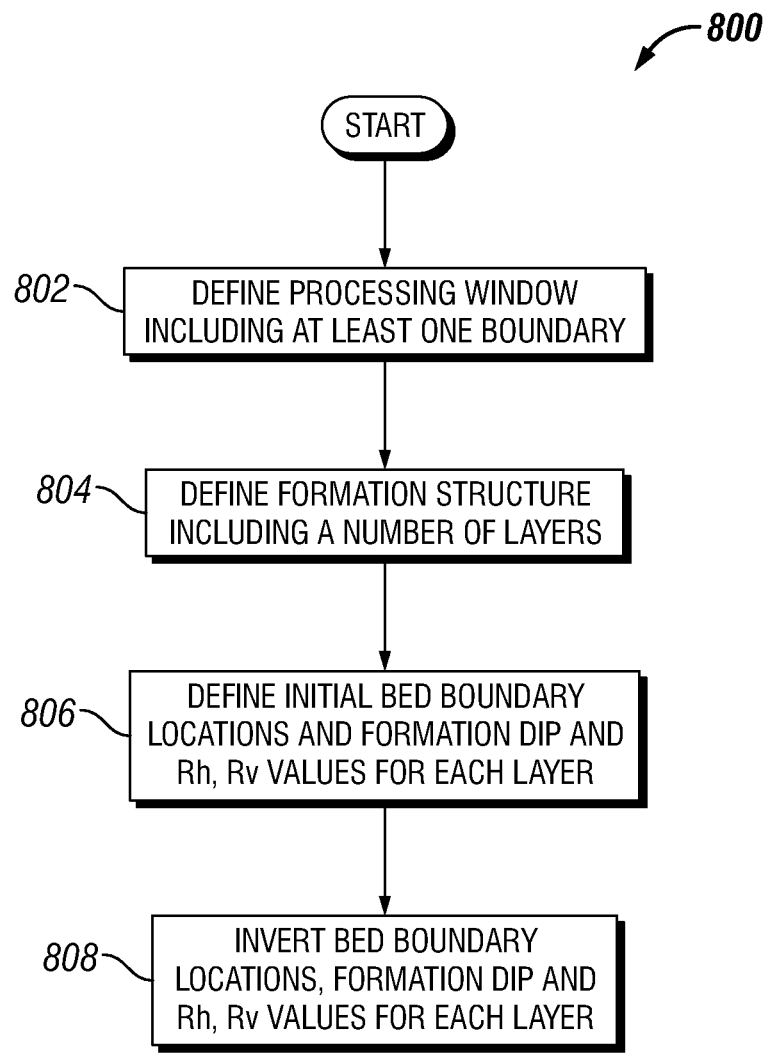
FIG. 8 illustrates a flow diagram of another example method for determining formation parameters in accordance with one or more example embodiments.

Another process 800 in accordance with one or more example embodiments is shown in FIG. 8. As shown in FIG. 8, with the help of bed boundaries with sufficient resistivity contrast, to invert to determine formation parameters dip, Rh, and Rv in each layer may be determined from non-directional resistivity responses (e.g., using just z-z couplings independently of directional resistivity responses and/or measurements). For instance, at block 802, a processing window may be defined, which may include at least one boundary. At block 804, a formation structure may be defined within the processing window, and the formation structure may include a number of layers. At block 806, initial bed boundary locations, dip, Rh, and Rv values for each layer within the processing window may be defined and/or otherwise provided. Such values can be provided by a user (e.g., an operator) and, further, more than one set of initial bed boundary locations dip, Rh, and Rv values may be provided in some embodiments. At block 808, the respective bed boundary locations, formation dip, Rh, and Rv values for each layer within the processing window may be inverted. As will be appreciated, constraints can be imposed on these inversions to ensure feasible solutions.

As shown in FIG. 8, with sufficient resistivity contrast, non-directional resistivity measurements may also be sensitive to bed boundary locations. Furthermore, the process 800 may be similar to the process 700 of FIG. 7. However, one difference may be that the process 800 may also use bed boundaries as an initial parameter (e.g., at block 806) for an inversion that additionally solves for bed boundary locations (e.g., at block 808) for each layer.

Figure 9:
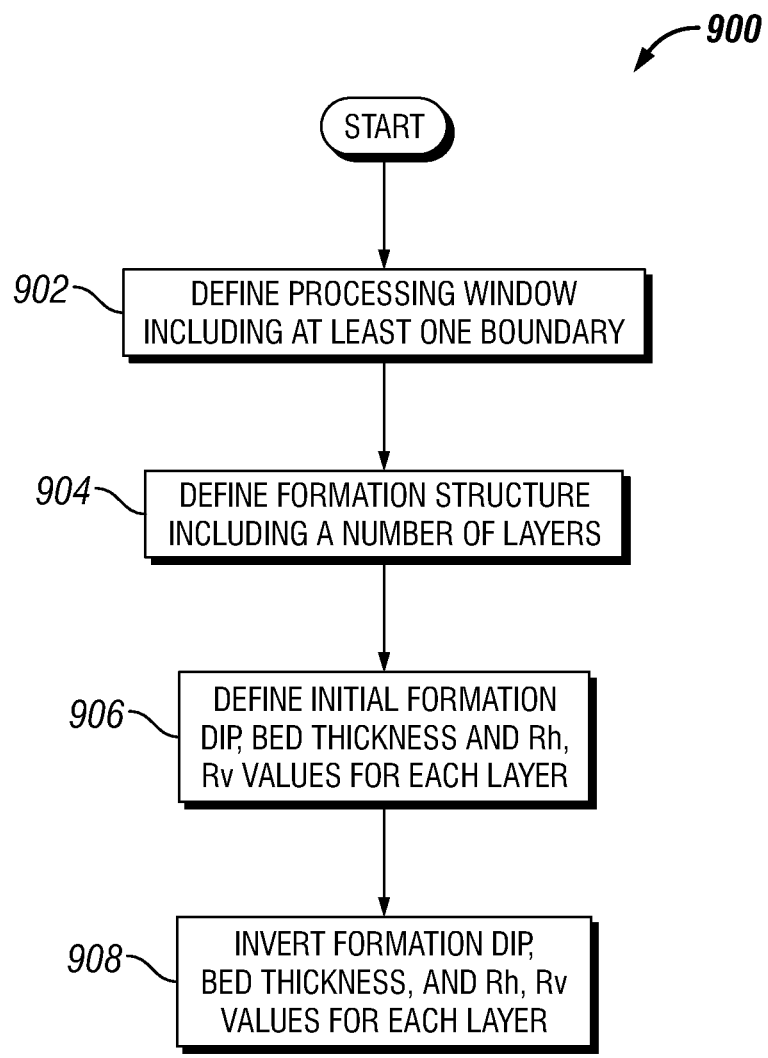
FIG. 9 illustrates a flow diagram of another example method for determining formation parameters in accordance with one or more example embodiments.

Further, in the case of more than one bed boundary (e.g. more than two layers in the formation model), another example embodiment may solve for bed boundaries by expressing the bed boundaries as a thickness of each layer. As such, another process 900 is illustrated in FIG. 9 in accordance with one or more example embodiments. As shown in FIG. 9, the process 900 may be similar to the process 800 of FIG. 8. However, one difference may be that the process 900 also uses bed thickness as an initial parameter (e.g., at block 906) for an inversion, and solves for the bed thickness (e.g., at block 908) for each layer.

For example, at block 902, a processing window may be defined, which may include at least one boundary. At block 904, a formation structure may be defined within the processing window, and the formation structure may include a number of layers. At block 906, initial dip, bed thickness, Rh, and Rv values for each layer within the processing window may be defined and/or otherwise provided. Such values can be provided by a user (e.g., an operator) and, further, more than one set of initial dip, bed thickness, Rh, and Rv values may be provided in some embodiments. At block 908, the respective formation dip, bed thickness, Rh, and Rv values for each layer within the processing window may be inverted. As will be appreciated, constraints can be imposed on these inversions to ensure feasible solutions.

Thus, in some embodiments, when in the proximity of bed boundaries with sufficient resistivity contrast (e.g., a generally high contrast such as shown in FIG. 3), formation parameters such as formation dip, bed boundary locations and/or bed thicknesses, Rh, and Rv of each layer can be solved using non-directional resistivity measurements (e.g., z-z couplings) independently of directional resistivity responses and/or measurements. These formation parameters may be similarly determined for high angle or horizontal wells where solving for Rv and dip may be difficult due to the coupling of these parameters in high angle/horizontal cases. As can be appreciated, any additional embodiment that inverts for a subset of the formation parameters discussed above in FIGS. 7-9 may be within the scope of this disclosure.

As will be understood, the various techniques described above and relating to inverting for formation parameters, such as Rh, Rv, and dip, in high angle or horizontal wells using non-directional resistivity measurements (e.g., independently of directional resistivity measurements) are provided herein as example embodiments. Accordingly, it should be understood that the present disclosure should not be construed as being limited to only the examples provided above. Further, it should be appreciated that the techniques disclosed herein may be implemented in any suitable manner, including hardware (suitably configured circuitry), software (e.g., via a computer program including executable code stored on one or more tangible computer readable medium), or via using a combination of both hardware and software elements. Further, it is understood that the techniques described herein may be implemented on a downhole processor (e.g., a processor that is part of an electromagnetic logging tool, such as tool 50 of FIG. 2), such that the inversion processing is performed downhole, with the results sent to the surface by any suitable telemetry technique. Additionally, in other embodiments, non-directional electromagnetic measurements may be transmitted uphole via telemetry, and the techniques for solving for Rh, Rv, dip, and potentially other parameters in high angle or horizontal wells may be performed uphole on a surface computer (e.g., one that is part of control system 152 in FIG. 1).

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed. It will be understood that some or all of the blocks of the block diagrams and flow diagrams, and combinations of blocks in the block diagrams and flow diagrams, respectively, can be implemented by computer-executable program instructions.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements to be performed on the computer or other programmable apparatus to produce a computer-implemented process such that the instructions that execute on the computer or other programmable apparatus provide elements or operations for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way used for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A method comprising:
using an electromagnetic logging tool comprising at least one axial transmitter antenna and at least one axial receiver antenna to acquire non-directional resistivity measurements in a wellbore of a high angle or horizontal well;
defining a processing window that corresponds to a measurement point of the electromagnetic logging tool along a well trajectory that intersects at least one bed boundary between two layers of a subsurface formation;
defining a formation structure corresponding to the processing window, the formation structure including a number of layers and respective locations associated with the at least one bed boundary;
defining an initial set of formation parameters for each layer in the formation structure, the formation parameters including at least a horizontal resistivity and a vertical resistivity of a first layer in the formation structure and a formation dip; and
determining the formation parameters for each layer by simultaneously inverting the formation parameters from said acquired non-directional resistivity measurements.

2. The method of claim 1, wherein the formation parameters comprise the horizontal resistivity and the vertical resistivity of the first layer, a horizontal resistivity and a vertical resistivity of a second layer in the formation structure, and the formation dip.

3. The method of claim 1, wherein the formation parameters are determined independently of directional resistivity measurements.

4. The method of claim 1, wherein the electromagnetic logging tool does not comprise a tilted or transverse antenna.

5. The method of claim 1, wherein the formation parameters further comprise a location of the in the formation structure.

6. The method of claim 1, wherein the formation parameters further comprise a bed thickness of at least one the layers of the formation structure.

7. A system, comprising:
at least one processor; and
at least one non-transitory memory storing computer-executable instructions, that when executed, causes the at least one processor to:
receive non-directional resistivity measurements in a wellbore of a high angle or horizontal well from an electromagnetic logging tool, the electromagnetic logging tool comprising at least one axial transmitter antenna and at least one axial receiver antenna to acquire the non-directional resistivity measurements;
define a processing window that corresponds to a measurement point of the electromagnetic logging tool along a well trajectory that intersects at least one bed boundary between two layers of a subsurface formation;
define a formation structure corresponding to the processing window, the formation structure including a number of layers and respective locations associated with the at least one bed boundary;
define an initial set of formation parameters for each layer in the formation structure, the formation parameters including at least a horizontal resistivity and a vertical resistivity of a first layer in the formation structure and a formation dip; and
determine the formation parameters for each layer by simultaneously inverting the formation parameters from said received non-directional resistivity measurements.

8. The system of claim 7, wherein the formation parameters comprise the horizontal resistivity and the vertical resistivity of the first layer, a horizontal resistivity and a vertical resistivity of a second layer in the formation structure, and the formation dip.

9. The system of claim 7, wherein the formation parameters are determined independently of directional resistivity measurements.

10. The system of claim 7, wherein the electromagnetic logging tool does not comprise a tilted or transverse antenna.

11. The system of claim 7, wherein the formation parameters further comprise a location of the bed boundary in the formation structure.

12. The system of claim 7, wherein the formation parameters further comprise a bed thickness of at least one the layers of the formation structure.

13. A non-transitory computer-readable medium storing computer-executable instructions, that when executed by at least one processors, causes the at least one processor to:
receive non-directional resistivity measurements in a wellbore of a high angle or horizontal well from an electromagnetic logging tool, the electromagnetic logging tool comprising at least one axial transmitter antenna and at least one axial receiver antenna to acquire the non-directional resistivity measurements;
define a processing window that corresponds to a measurement point of the electromagnetic logging tool along a well trajectory that intersects at least one bed boundary between two layers of a subsurface formation;
define a formation structure corresponding to the processing window, the formation structure including a number of layers and respective locations associated with the at least one bed boundary;
define an initial set of formation parameters for each layer in the formation structure, the formation parameters including at least a horizontal resistivity and a vertical resistivity of a first layer in the formation structure and a formation dip; and
determine the formation parameters for each layer by simultaneously inverting the formation parameters from said received non-directional resistivity measurements.

14. The non-transitory computer-readable medium of claim 13, wherein the formation parameters comprise the horizontal resistivity and the vertical resistivity of the first layer, a horizontal resistivity and a vertical resistivity of a second layer in the formation structure, and the formation dip.

15. The non-transitory computer-readable medium of claim 13, wherein the formation parameters are determined independently of directional resistivity measurements.

16. The non-transitory computer-readable medium of claim 13, wherein the electromagnetic logging tool does not comprise a tilted or transverse antenna.

17. The non-transitory computer-readable medium of claim 13, wherein the formation parameters further comprise a location of the bed boundary in the formation structure.

18. The non-transitory computer-readable medium of claim 13, wherein the formation parameters further comprise a bed thickness of at least one the layers of the formation structure.

* * * * *